United States Patent Office 3,051,314
Patented Aug. 28, 1962

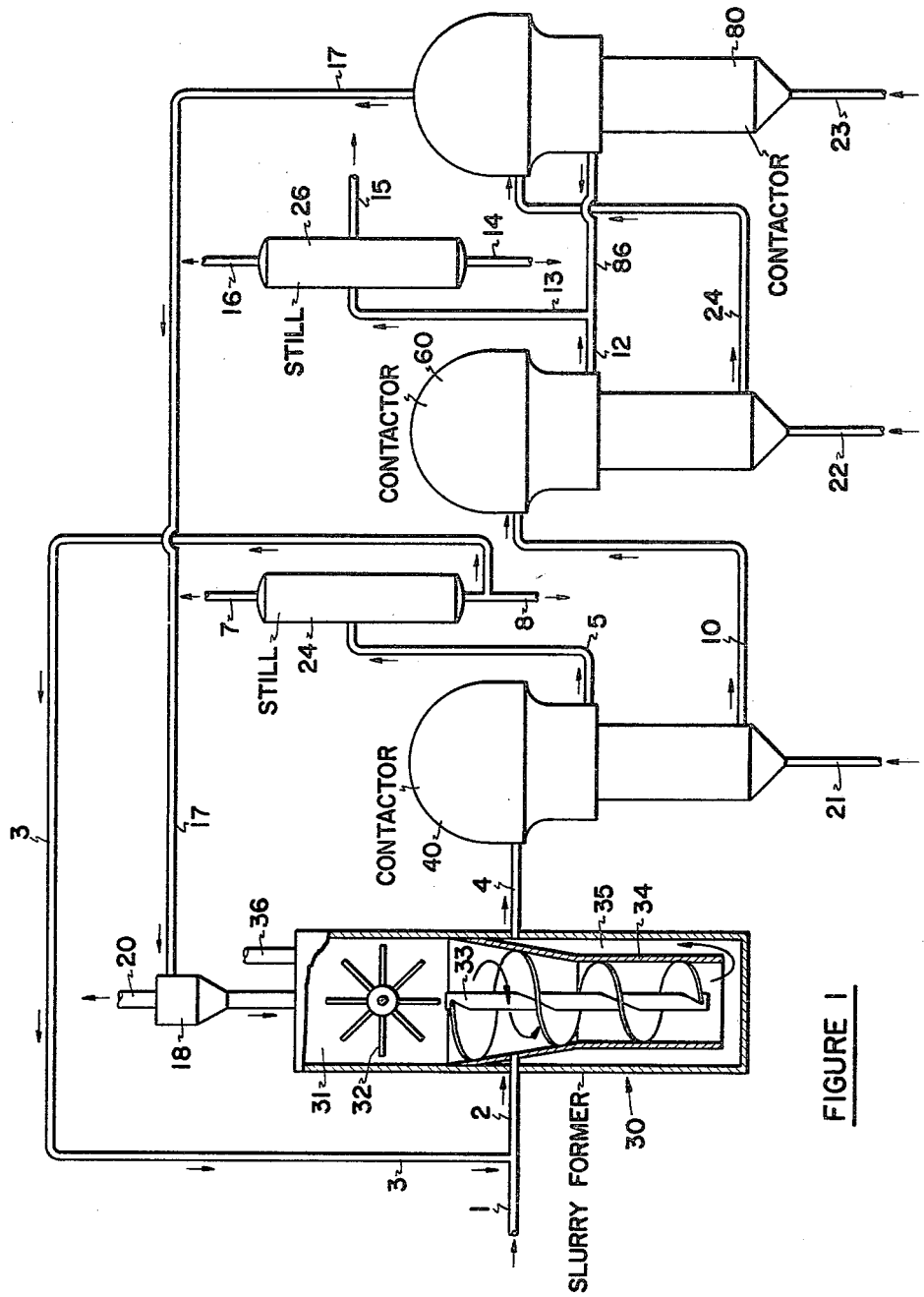

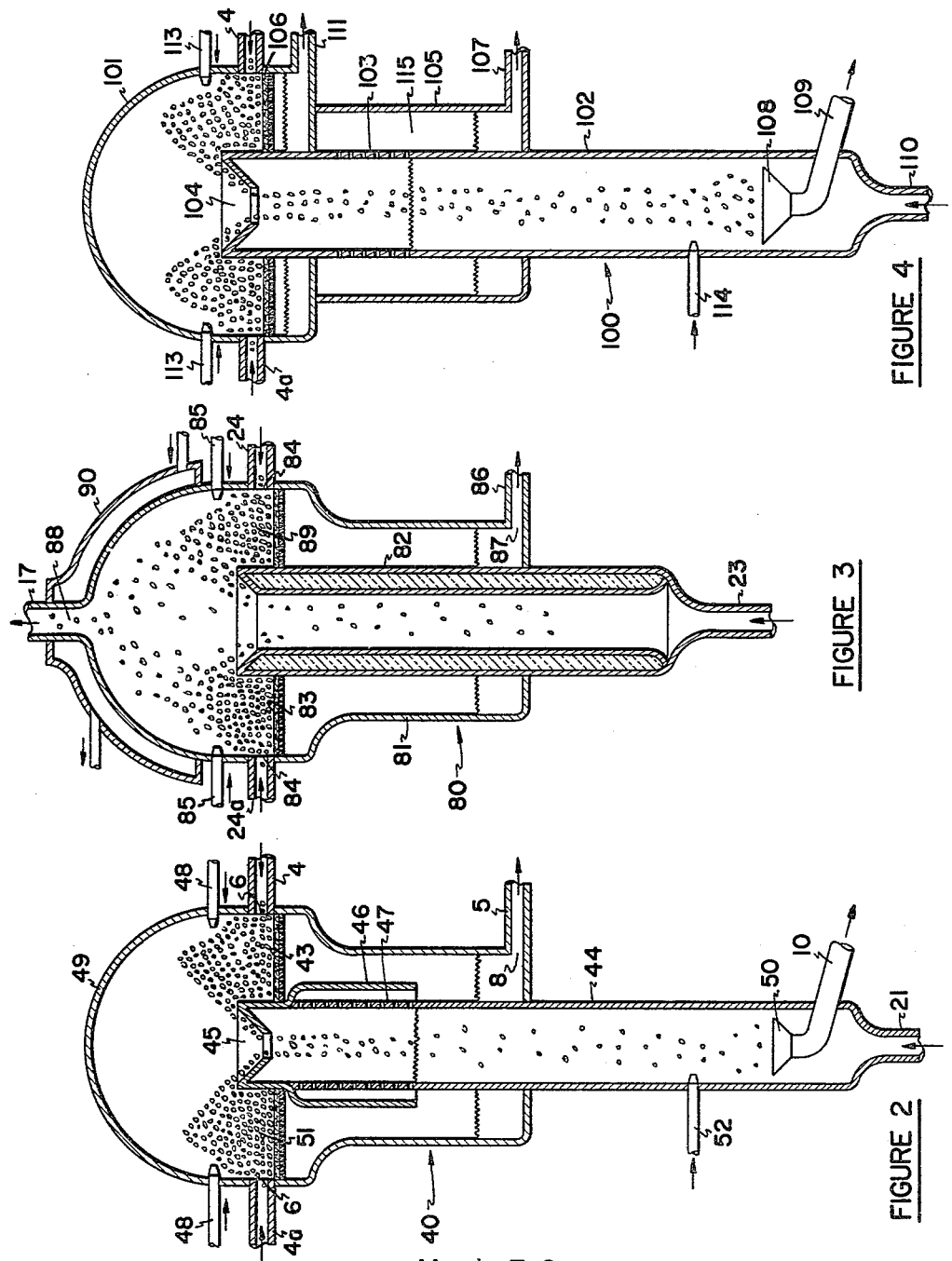

3,051,314
TREATING FINELY-DIVIDED SOLIDS
Mervin E. Conn, Westfield, N.J., assignor to Esso Research and Engineering Company, a corporation of Delaware
Filed Nov. 17, 1959, Ser. No. 853,593
8 Claims. (Cl. 210—189)

The present invention relates to an improved apparatus for treating finely-divided solids. More particularly, the present invention is concerned with an apparatus for removing contaminants, adsorbed liquids or gases, deposits or the like, from finely-divided solids, such as catalysts, adsorbents or the like. More specifically, the present apparatus provides a treating device for finely-divided solids recovered in slurry form. The invention is applicable with particular advantage to the removal of adsorbed aromatics from a finely-divided silica gel.

In the past, when finely-divided solids which contained adsorbed gases or liquids, desirable deposits, contaminants or the like, were recovered as a slurry, the slurry was filtered and treated in situ with a suitable liquid solvent, reactant, or the like. Such a procedure was limited to batch processing techniques. Furthermore, intimate contact of the solvent or reactant with the filter cake was virtually impossible to achieve. If the filter cake is removed, broken up, and contacted with the solvent or reactant, the process was still batchwise in nature and the filter cake removal step required considerable labor and resulted in loss of solids.

If the solids required a two-step treating process to remove therefrom the contaminants, deposits, adsorbed materials, or the like, it was customary to slurry the finely-divided solids with a suitable solvent or reactant, filter the slurry, and recontact the filter cake with fresh solvent or reactant. The process was again a batch technique and contact between the finely-divided solids and the solvent or reactant was limited.

In accordance with the instant invention, the aforementioned difficulties are overcome and various additional advantages, as will be fully understood from the following detailed description, are achieved. The present invention provides an apparatus whereby contaminants, deposits, adsorbed gases or liquids or the like, found in a finely-divided solid may be removed therefrom in a continuous manner. Additionally, if the finely-divided solids are recovered in the form of a slurry, the instant apparatus allow continuous separation of the finely-divided solids from the slurry liquid and transfer of the recovered solids to a countercurrent treating zone wherein the contaminants, or the like, are removed from the finely-divided solids.

The invention will best be understood from the more detailed description hereinafter in which reference will be made to the accompanying drawings.

FIGURE 1 is a schematic flow plan of a specific illustration wherein the instant process and apparatus may be employed.

FIGURE 2 is a cut-away view illustrating apparatus wherein finely-divided solids in a slurry may be continuously separated therefrom and treated with a suitable solvent or reactant.

FIGURE 3 is a cut-away view of an apparatus wherein finely-divided solids in a slurry may be continuously separated therefrom and contacted with a gaseous treating agent.

FIGURE 4 is a cut-away view of an apparatus wherein finely-divided solids in a slurry may be continuously separated therefrom and contacted with a solvent or reactant which will remain separated from the liquid recovered from the original slurry.

Exemplary application of the instant invention pertains to the use of a silica gel to segregate a liquid mixture (e.g. a kerosene or gas oil) into naphthenic and aromatic fractions and the detailed description which follows will be in connection therewith. It should be understood, however, that the method and apparatus discussed herein is equally well adapted for the purification of any finely-divided solids containing soluble or reactive deposits, adsorbed material, or the like.

Referring now in detail to FIGURE 1, a mineral oil fraction containing substantially aromatics and naphthenes, such as a Mirando distillate boiling within the range of 400 to 550° F., is obtained from a suitable source via line 1 and, with recycle 3 (to be discussed hereinafter) from still 24, directed to the inner portion of slurry former 30 through line 2. Here it contacts finely-divided solid silica gel fed from hopper 31 through star feeder 32. Line 36 may be employed as a vent or a supply line for make-up gel or both. The oil and gel are mixed and pumped by a screw 33, turning on a vertical axis as shown, downwardly through the inner zone formed by tapering circular wall 34, upwardly through the annular cavity 35, and out of slurry former 30 through line 4. During this mixing of the gel and oil, the aromatics in the oil are adsorbed by the silica gel. Undesirably, however, a small amount of naphthenes will also be adsorbed by the silica gel.

Although not indicated in FIGURE 1, normal heptane may be mixed with the oil feed. In either case, the whole operation may be carried out at above ambient temperatures. The proportion of solid to liquid is controlled to keep the resultant slurry in a pumpable condition.

The slurry from line 4 enters liquid-solid contactor 40 wherein the spent gel is filtered from the treated oil, washed with n-heptane entering through line 21 to desorb any saturates contained therein, reslurried with n-heptane, and withdrawn as such through line 10. The treated oil and part of the n-heptane solvent employed in liquid-solid contactor 40 is withdrawn through line 5 and directed to a still 24. In still 24 the naphthenes are separated from the n-heptane by conventional distillation techniques, the naphthenes being withdrawn as bottoms through line 8, and the n-heptane being withdrawn overhead through line 7. A portion of the naphthenes recovered in line 8 may be recycled through line 3 to the slurry former. The n-heptane may be condensed and recycled to contactor 40.

The operation and structure of liquid-solid contactor 40 will be explained in more detail with reference to FIGURE 2. The liquid-solid contactor comprises a housing 49 having a plurality of inlets 6 in the upper portion thereof adapted to receive the slurry from line 4 which contains the finely-divided silica gel to be treated. Line 4 may be split into a plurality of streams in any known manner so as to provide slurry to the contactor at a plurality of locations. FIGURE 2, which is merely illustrative, shows line 4 having been split into other individual lines, such as 4a. The size of inlets 6 and the feed rate of the slurry through these inlets are adjusted to give sufficient velocity to prevent accumulation of filter cake which would plug inlets 6.

A hollow member 44 extends upwardly into housing 49, its uppermost portion extending above inlets 6. Although the particular cross-sectional configuration of member 44 is not critical, it will usually be preferably circular. Member 44 has a solid wall with the exception of section 47 which is porous and constructed with a filter medium, such as wire mesh fine enough to retain any solids but allowing easy passage therethrough of the liquid. Section 47 may be an integral part of member 44 as by merely perforating member 44 to form a multiplicity of holes or slots which will only permit passage therethrough of the liquid. Furthermore, the interior walls of section 47 may be covered with another filter medium held in place by suitable known means. Attached to the uppermost portion of member 44 is lip 45, the purpose of which will be more clearly understood hereinafter. A shield 46 extends around section 47 and prevents liquids from entering member 44 through section 47. In the lower portion of member 44 there is positioned a funnel-shaped member 50 which is connected to line 10, whereby the silica gel may be withdrawn as a slurry for further processing.

A filtration plate or section 43 is attached to housing 49 and member 44 so as to be substantially horizontal. It is positioned below inlets 6 and above the filtering section 47 in member 44. Filtration section or plate 43 comprises a conventional filter medium, such as woven fabrics from fibers, metal strands, glass filaments and the like, supported by a suitable perforated plate. The porosity of the filter is selected to retain the solids and permit easy passage of the liquid.

Liquid-solid contactor 40 is operated in the following manner. The slurry of gel and treated oil pass through lines 4 and 4a and inlets 6 into annular zone 51. There the liquid portion of the slurry flows downwardly by gravity through filtration plate or section 43. The finely-divided gel remains on the filter media and accumulates sufficiently to overflow onto lip 45 and into member 44. The movement of the gel is assisted by positioning the filter media 43 just below the lowermost portion of inlets 6 and by maintaining a suitable nozzle velocity on the slurry entering through inlets 6. The distance that the uppermost portion of member 44 extends above filtration section 43 is one means of controlling the overflow of finely-divided gel into member 44. Jets 48, however, are preferably employed to assist the transfer of the gel into member 44. The jets may be a multiplicity of small pipes or tubes, properly directed and sufficient in number to keep the wet filter cake moving from annular zone 51 up over lip 45 and into member 44. The diameter of the jet outlets and rate of liquid flow therethrough are adjusted to give a substantial velocity and pressure drop at the jet nozzles. In general, the kinetic energy of the jetted liquid will need to be equal to or greater than the energy needed to disintegrate the filter cake and lift it over lip 45. Gases may be employed, if desired, by providing vent means in housing 49. Ordinarily, the liquid employed in jets 48 would be the same as that entering member 44 through line 21. In this case n-heptane is employed in jets 48.

The gel, which is now separated from the treated oil, flows into member 44 where it contacts an upwardly flowing stream of n-heptane which entered through line 21. The gel descends, by gravity, through the column of liquid in member 44, is collected by funnel 50, and withdrawn continuously as a slurry through line 10. During its descent, the gel is subjected to a very efficient countercurrent treating step whereby any adsorbed saturated hydrocarbons are desorbed from the gel by the n-heptane. A portion of the entering n-heptane, primarily that portion which contains the desorbed saturates, overflows through section 47, is collected together with the treated oil and withdrawn from the lower portion of housing 49 via outlet 8 and line 5. If desired, additional n-heptane could be jetted into member 44 by means of jets 52 for even greater mixing of the gel and solvent. Jets 52 may be conventional pipes or tubes with exit diameters small enough to provide a degree of turbulence and mixing.

Although member 44 is shown in the drawing to have a uniform diameter, it may be desirable to have the diameter vary from bottom to top. For example, below the collection or funnel-shaped member 50, the diameter may be progressively reduced. The space between the top of collector 50 and member 44 should be adjusted to provide a relatively high liquid velocity therein so that the finely-divided silica gel will be unable to by-pass the collector. Likewise, the portion of member 44 located above the top of collector 50 may be progressively decreased in size as the top of member 44 is approached. This will increase the contact time between the gel and solvent. The size of member 44 and the rates of the streams to and from member 44 must be adjusted so that the gel holdup does not exceed the limits of a fluid slurry. Additionally, the solvent velocity up through member 44 must be low enough to permit the gel to settle at an adequate rate. Determination of these variables for the various uses of this apparatus would be within the ordinary skill of one in the art.

Returning to the process shown in FIGURE 1, the slurry withdrawn through line 10 from contactor 40 is directed to liquid-solid contactor 60. Liquid-solid contactor 60 is similar in all respects to the apparatus shown in FIGURE 2. In this contactor, however, the gel is separated from the n-heptane carrier and countercurrently contacted with acetone entering via line 22. Acetone is employed to desorb the aromatics on the finely-divided silica gel. The slurry of acetone and gel leaves contactor 60 through line 24 and is directed to gas-solid contactor 80. The n-heptane, extracted aromatics and part of the acetone are removed from contactor 60 by line 12 and directed through line 13 to still 26.

In gas-solid contactor 80 the acetone is separated from slurry 24 and the finely-divided silica gel contacted with superheated steam entering via line 23 to remove from the gel any traces of acetone or hydrocarbons therein. The steam and suspended gel are carried overhead through line 17 to a cyclone separator (not shown), where the gel and steam are separated. The gel is dropped through a dip-leg into a dense-phase hindered settler, wherein the gel is contacted with hot air or other gas to further regenerate and dry it. This air contactor can be a bottom-drawoff device, wherein the gel flows into a line and is blown with air to cyclone separator 18. In cyclone separator 18 the gel is separated from the air and falls into hopper 31 for further use in the process previously described. The separation of the gel from the steam and the hot air treatment are accomplished by conventional equipment well known in the art (e.g., fluid catalytic cracking) and does not require further amplification herein. The steam separated from the gel is condensed and discarded or run into a separator for removal and recovery of any oil present therein.

The operation and structure of gas-solid contactor 80 will be explained in more detail with reference to FIGURE 3. Gas-solid contactor 80 comprises a housing 81 having inlets 84 in the upper portion thereof adapted to receive the slurry containing the acetone and spent gel from lines 24 and 24a. Located above inlets 84 is outlet 88 adapted to allow exit of steam and gel via line 17. Line 24 may be split into a plurality of streams in any known manner so as to provide slurry to the contactor at a plurality of locations. FIGURE 3, which is merely illustrative of one means, shows line 24 having been split into other individual lines, such as 24a.

A hollow member 82 extends upwardly into housing 81, its uppermost portion extending above inlets 84. Again, although not critical, member 82 will preferably have a circular cross-section as shown. Member 82 is connected at its lower portion with line 23 wherein the superheated steam enters. A filtration plate or section 83 is attached to housing 81 and member 82 and positioned substantially horizontal. It is positioned below inlets 84 and forms an annular chamber 89 with member 82 and housing 81. Filtration plate or section 83 may be substantially the same as that previously described for section 43 of contactor 40. In the lower portion of housing 81 there is located an outlet 87 adapted to discharge liquid via line 86.

The slurry of gel and acetone enter gas-solid contactor 80 through lines 24 and 24a and inlets 84. In annular zone 89 the liquid portion of the slurry moves downwardly by gravity through filtration plate or section 83, the finely-divided gel resting thereon. The finely-divided silica gel accumulates sufficiently to overflow into hollow member 82. The movement of the gel is assisted by positioning the filtration plate or section 83 just below the lowermost portion of inlets 84. The distance the uppermost portion of member 82 extends above filter media 83 is one means of controlling the gel overflow. It is preferable, however, to employ jets 85 to assist the transfer of gel toward member 82. Jets 85 will direct superheated steam against the accumulated mass of gel in annular zone 89, thereby forcing the gel into annular member 82 and into the stream of superheated steam entering through line 23. Jets 85 are similar to jets 48 previously described, with the exception that they employ a gas rather than a liquid. The gel and superheated steam are intimately contacted in member 82 or housing 81 or both and passed upwardly out through line 17 to the cyclone separator in the manner previously discussed. Note, housing 81 may be steam jacketed and/or heat insulated by means 90 to prevent steam condensation. Also, note that member 82 may be double-walled and insulated (as shown), to reduce transfer of heat from 82 to 81 and thus to minimize vaporization of the acetone in housing 81.

The acetone which was separated from the slurry entering via line 24 descends through filtration plate 83 into the bottom portion of housing 81. There the acetone, extracted aromatics and some condensed steam are withdrawn through outlet 87 and line 86.

Returning to the process disclosed in FIGURE 1, stream 86 is mixed with stream 12 to form stream 13 which is passed to a conventional still 26 for fractionation. The overhead from still 26, which is withdrawn by line 16, will comprise the acetone which was employed to remove the aromatics from the gel. This may be recycled to contactor 60 if desired. A middle stream 15 recovered from still 26 will contain the normal heptane and any water which accumulated in gaseous contactor 80 as condensation. The bottoms 14 will contain primarily the aromatics which were adsorbed originally by the gel.

With reference to FIGURE 4, there is shown a modification of the liquid-solid contactor shown in FIGURE 2. Liquid-solid contactor 100, though similar in many respects to contactor 40, differs therefrom in that the liquid separated from the slurry which is fed to the contactor is kept substantially unmixed with the liquid which counter currently contacts the finely-divided solids which were recovered from the slurry.

Liquid-solid contactor 100 comprises a housing 101 having a plurality of inlets suitable for admitting slurry from lines 4 and 4a into its upper portion. A hollow member 102 extends upwardly into housing 101, its uppermost portion extending above the slurry inlets. Member 102 is similar to member 44 of FIGURE 2, except that it does not contain a shield for reasons appearing hereinafter. In all other respects the two members are identical and a detailed discussion of lip 104 and filtration section 103 is therefore unnecessary as they are equivalent to lip 45 and filtration section 47, respectively.

A filtration plate or section 106, similar in all respects to filtration plate 43 in FIGURE 2 or filtration plate 83 in FIGURE 3, is attached to housing 101 and member 102 so as to be substantially horizontal. It is positioned below the slurry inlets and above filtration section 103 of member 102. The bottom portion of housing 101 fits snugly around member 102 to seal it from chamber 115 formed by housing 105 and member 102. Housing 101 has an outlet in its lower portion suitable for withdrawing liquid via line 111. Housing 105 is attached to the bottom of housing 101, and contains an outlet suitable for withdrawing liquid therefrom via line 107.

Near the bottom of hollow member 102 there is positioned a collector or funnel-shaped member 108 attached to pipe 109 which passes through hollow cylindrical member 102 and may withdraw liquid therefrom. Liquid enters cylindrical member 102 through line 110 which communicates therewith at a point below funnel-shaped member 108. The relationship between members 108 and 102 is similar in all respects to that previously discussed in regard to members 50 and 44 of FIGURE 2.

The operation and advantages of employing contactor 100 may be seen most readily by employing this contactor, instead of contactor 40, in the processing system shown in FIGURE 1. Under these circumstances the slurry comprising the treated gas oil and the silica gel would enter annular zone 112 in contactor 100 via lines 4 and 4a. The treated oil would flow downwardly through filtration plate 106 leaving thereon the spent gel. The spent gel would accumulate in annular zone 112 and tend to overflow into hollow cylindrical member 102. The amount of overflow may be controlled by the position of filtration plate 106, the height of hollow member 102 above the filtration plate and the flow rate of the slurry entering the contactor 100. It is preferred that jets 113 be employed to assist the transfer of accumulated gel from annular zone 112 to member 102. Jets 113 are similar in all respects to jets 48 of FIGURE 2 and direct a stream of fluid against the accumulated gel to assist its movement to the desired point. The fluid in this case would be liquid n-heptane. A lip 104 attached to the uppermost portion of member 102 maintains the downward flow of gel away from the walls of member 102. The treated gas oil which has been separated from the spent gel may be withdrawn from housing 101 by means of line 111.

The spent gel which enters hollow member 102 intimately contacts the upward flow of normal heptane which enters via line 110. Any saturates which were adsorbed by the silica gel during the initial treating step will be removed by this efficient countercurrent contacting step. A portion of the normal heptane entering through line 110 will overflow through filter section 103 into housing 105 to be withdrawn therefrom by line 107. The thoroughly treated silica gel descends to funnel member 108 and is withdrawn via line 109 as a slurry with normal heptane. Jets 114 may be employed to introduce additional normal heptane to a middle portion of tubular member 102 to further assist in intimate contacting of the silica gel with the normal heptane. Jets 114 are similar in all respects to jets 52 previously discussed.

The advantage of the particular embodiment shown in contactor 100 is readily apparent. It provides a method and apparatus whereby the silica gel may be separated from the treated product, contacted with a solvent to remove adsorbed materials, and withdrawn as a slurry with the particular solvent employed. In this apparatus and method the treated oil and the solvent are not mixed, except for the small amount of solvent that might find its way from jets 113 into stream 111. Even this can be avoided if another fluid, as for example nitrogen or other inert gas, is employed in jets 113. Thus, stream 111 which contains the desired materials is not mixed with stream 107 which is a very dilute solution of desired saturates in normal heptane.

In general, the apparatus of FIGURE 4 will be preferred to that of FIGURE 2, if the two fluids involved are incompatible in admixture, difficult to separate one from the other or give rise to deposits, plugging or other operating troubles.

While the invention has been described herein specifically with reference to the separation of aromatics and naphthenes from a gas oil containing the same, it is equally well applicable to a similar treatment of other finely-divided solids in general. For example, nickel catalyst deactivated in fat hydrogenation may be treated with dilute alcohols or alkali solutions in accordance with my invention. Sulfo-active hydrogenation catalyst may be freed from impurities by the contacting method and apparatus disclosed herein. An example for the treatment of non-catalytic solid is the extraction of tarry substances from contact solids used in the purification of gases. Whereas the contact mass used in conventional operations must be taken out of service intermittently to remove tarry deposits, use of the instant technique allows continuous operation of the purification step. Other examples will occur to those skilled in the art.

It will also be understood that the process and apparatus of my invention is not limited to the removal of soluble deposits from finely-divided solids. It may likewise be used to carry out a chemical reaction between finely-divided solids or certain constituents thereof and chemical treating liquors or gases with the attending advantages of continuous operation, intimate contact of reactants and rapid separation of reaction products.

The limitations on the process are few. The finely-divided solid must be substantially insoluble and capable of being dispersed in the liquid feed to the treater in the form of a pumpable slurry. The contaminant may be normally liquid or solid. The solid must be denser than the treating fluid to operate in a hindered-settler countercurrent treatment. The liquid or gas employed in the treatment must be capable of dissolving or reacting with the contaminant so as to remove it, or part of it, and thus purify the finely-divided solids. If gases are generated through chemical reaction or vaporization, vent lines may be provided. Condensing equipment, if desired, may also be employed.

Furthermore, it should be noted that the apparatus described in FIGURES 2–4 may be employed to effect a two-step treating process on finely-divided solids which are recovered as dry solids. The solids may be slurried with a treating agent in a known manner and directed to the contactor as previously discussed wherein the second treating step may be effected in a continuous manner. Thus, the method and apparatus of the instant invention may be employed when the finely-divided solids are received in a non-slurry condition.

It will also be apparent that the apparatus of this invention can be combined with fluid solids handling equipment well known in the art of catalytic cracking, catalytic reforming, or other processing involving handling finely-divided solid gaseous mixtures in a fluid condition. The combined equipment can be used to carry out continuous operations on (1) fluid slurries of finely divided solids in liquid in some parts of the overall process, and (2) fluid suspensions of finely-divided solids in gases in other parts of the overall process. The continuous operations cover separations of the solids from liquid or gas, resuspension of the solids in another liquid or gas, transference of the solids from one part of the process to another, and treating of the solids with liquid or gas to carry out chemical reactions, physical separations, or other treatments on the solids, on the gas, or on the liquid.

Although a preferred embodiment of the invention has been described in detail, it will be understood that various modifications and changes may be made therein without departing from the scope and spirit of the invention.

What is claimed is:

1. An apparatus for continuously treating finely-divided solids in a slurry which comprises a housing having at least one inlet to receive said slurry, a filter medium mounted within said housing extending laterally therein to separate said slurry into finely divided solids and a liquid, said filter medium being adjacent to and below said inlet, a hollow member extending upwardly into said housing through said filter medium, means to introduce a fluid into said hollow member, means to transfer said solids from said filter medium into said hollow member, means to withdraw said solids from said hollow member, means to withdraw said fluid from said hollow member and means to withdraw said liquid from said housing below said filter medium.

2. The apparatus of claim 1 wherein said fluid is a gas and said means to withdraw said fluid from said hollow member is an outlet in said housing adapted to withdraw said gas.

3. An apparatus for continuously treating finely-divided solids in a slurry which comprises a housing having at least one inlet to receive said slurry, a hollow member extending upwardly into said housing above said inlet, a filter medium mounted within said housing extending laterally from said housing to said hollow member, said filter medium surrounding said hollow member, said filter medium being below said inlet, said housing having an outlet below said filter medium adapted to withdraw liquid from said housing, said hollow member having a filtering section located below said filter medium adapted to conduct liquid into said housing, said hollow member having an inlet for fluid to flow upwardly through said hollow member and means to withdraw solids from said hollow member below said filtering section.

4. An apparatus as in claim 3 wherein jets are located within said housing to impinge a stream of fluid on the solids on said filter medium and to assist transfer of said solids to said hollow member.

5. An apparatus as in claim 3 wherein said means to withdraw solids from said hollow member is a hollow funnel-shaped member and is located above said inlet for fluid in said hollow member.

6. An apparatus for continuously treating finely-divided solids in a slurry which comprises a housing having inlets adapted to receive said slurry, a filter medium extending laterally within said housing below and adjacent to said inlets, a hollow member forming a treating zone extending upwardly through said filter medium into said housing, said hollow member having an inlet above said filter medium adapted to receive said finely divided solids, said hollow member extending downwardly below said filter medium, means for introducing treating fluid into said hollow member below said filter medium, means to withdraw from said hollow member a slurry of treated finely-divided solids and treating fluid, means to withdraw from said hollow member said treating fluid and means to withdraw a liquid from said housing below said filter medium.

7. An apparatus as in claim 6 wherein jets for dispensing fluids communicate with said housing above said filter medium and assist transfer of finely-divided solids from said filter medium into said inlet of said hollow member.

8. An apparatus for treating finely-divided solids in a slurry which comprises a housing having at least one inlet adapted to receive said slurry and at least one outlet adapted to expel liquid therefrom, a filtering medium communicating with said housing and extending laterally across the interior of said housing, said filter medium dividing said housing into an upper chamber and a lower chamber, said outlet being in said lower chamber and said inlet being in said upper chamber, a hollow member extending upwardly through said filter medium above said inlet and downwardly into said lower chamber, said hollow member having a first and second inlet, a filtering section and an outlet, said first inlet of said hollow member being above said inlet of said housing and being adapted to conduct said finely-divided solids into said hollow member, said filtering section being below said filtering medium, said second inlet of said hollow member being below said filtering section and being adapted to conduct a treating fluid into said hollow member, said outlet of said hollow member being above said second inlet of said hollow member and being below said filtering section, said outlet being adapted to conduct said finely-divided solids from said hollow member.

References Cited in the file of this patent

UNITED STATES PATENTS

| | | |
|---|---|---|
| 1,648,670 | Atwell | Nov. 8, 1927 |
| 2,066,479 | MacIsaac | Jan. 5, 1937 |
| 2,481,253 | Snyder | Sept. 6, 1949 |
| 2,553,387 | Slama | May 15, 1951 |
| 2,571,421 | Clement | Oct. 16, 1951 |
| 2,658,623 | Thornhill | Nov. 10, 1953 |
| 2,904,518 | Shea | Sept. 15, 1959 |